(12) United States Patent
Velamur et al.

(10) Patent No.: US 11,323,521 B1
(45) Date of Patent: May 3, 2022

(54) EDGE DEVICE

(71) Applicant: Micron Technology, Inc., Boise, ID (US)

(72) Inventors: Sharmila Velamur, Boise, ID (US); Fatma Arzum Simsek-Ege, Boise, ID (US); Shivani Srivastava, Boise, ID (US); Marsela Pontoh, Boise, ID (US); Lavanya Sriram, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/225,204

(22) Filed: Apr. 8, 2021

(51) Int. Cl.
*G06F 15/16* (2006.01)
*H04L 67/125* (2022.01)
*H04L 67/00* (2022.01)

(52) U.S. Cl.
CPC ............ *H04L 67/125* (2013.01); *H04L 67/34* (2013.01)

(58) Field of Classification Search
CPC .............................. H04L 67/125; H04L 67/34
See application file for complete search history.

(56) References Cited

U.S. PATENT DOCUMENTS

| | | |
|---|---|---|
| 6,402,768 B1 | 6/2002 | Liebel |
| 6,854,974 B1 | 2/2005 | Suhonen |
| 8,978,189 B1 | 3/2015 | Sexton |
| D781,427 S | 3/2017 | Blank et al. |
| 2011/0154595 A1 | 6/2011 | Hill |
| 2016/0206415 A1 | 7/2016 | Kraft et al. |
| 2017/0232300 A1* | 8/2017 | Tran ........................ H04L 67/10 434/247 |

* cited by examiner

*Primary Examiner* — Normin Abedin
(74) *Attorney, Agent, or Firm* — Brooks, Cameron & Huebsch, PLLC (57) ABSTRACT

Methods, systems, and devices associated with an edge device are described. An edge device can include a processing resource and a memory resource having instructions executable to receive, at the processing resource, the memory resource, or both, and from a first source comprising a device in communication with the edge device, first input associated with a user of the device. The instructions can be executable to receive, from a second source, second input associated with a user of the device, determine, based on the first input and the second input, operational instructions for the device and transmit the operational instructions to the device. The instructions can be executable to update, using a machine learning model, the operational instructions responsive to receiving an indication of performance of the operational instructions by the device and responsive to third input received from the first source, the second source, or both.

20 Claims, 6 Drawing Sheets

EDGE DEVICE

TECHNICAL FIELD

The present disclosure relates generally to apparatuses, systems, and methods associated with an edge device.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can be used to transmit information to users via a display to view images and/or text, speakers to emit sound, and/or a sensor to collect data. A computing device can receive inputs from sensors on or coupled to the computing device. The computing device can be coupled to a number of other computing devices and can be configured to communicate (e.g., send and/or receive data) with the other computing devices and/or to a user of the computing device.

DETAILED DESCRIPTION

Apparatuses, systems, and methods associated with an edge device are described. An edge device as used herein includes a device (e.g., physical device) used for communication and interaction between devices on a network. Edge devices can mediate data in a network. Example edge devices include switching devices (also known as "switches"), routers, router/switching device combinations, models, access points, gateways, networking cables, network interface controllers, and hubs, among others. In some instances, an edge device can be or can include a controller. An edge device, in some examples of the present disclosure, can be a combination of hardware and instructions for determining and transmitting operational instructions to a device that is part of the same network as the edge device. The hardware, for example can include processing resource and/or a memory resource (e.g., MRM, computer-readable medium (CRM), buffer memory resource, data store, etc.).

Examples of the present disclosure provide a smart edge device that acts as a communication hub between a device and other computing devices, cloud storage, web interfaces, etc., while collecting, storing, and communicating data associated with the device and/or a user of the device. An edge device according to examples of the present disclosure can determine and update operational instructions for the device, for instance using a machine learning model.

Examples of the present disclosure can include an edge device comprising a processing resource and a memory resource in communication with the processing resource having instructions executable to receive, at the processing resource, the memory resource, or both, and from a first source comprising a device in communication with the edge device, first input associated with a user of the device. The instructions can be executable to receive, from a second source, second input associated with a user of the device, determine, based on the first input and the second input, operational instructions for the device and transmit the operational instructions to the device. The instructions, in some examples, can be executable to update, using a machine learning model, the operational instructions responsive to receiving an indication of performance of the operational instructions by the device and responsive to third input received from the first source, the second source, or both.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 100 can reference element "00" in FIG. 1, and a similar element can be referenced as 200 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
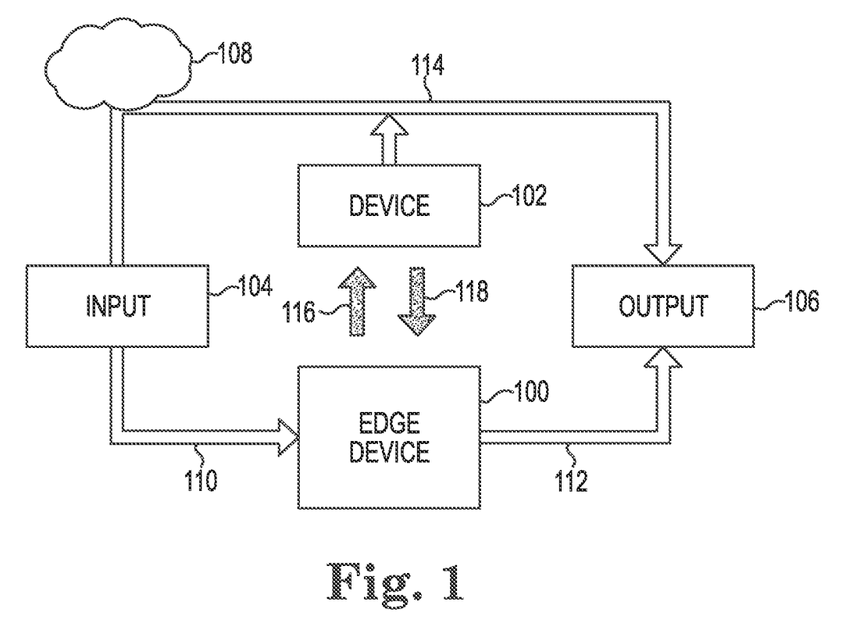
FIG. 1 is a diagram representing a system including a device and an edge device in accordance with a number of embodiments of the present disclosure.

FIG. 1 is a diagram representing a system including a device 102 and an edge device 100 in accordance with a number of embodiments of the present disclosure. FIG. 1 illustrates a device 102 in communication with an edge device 100. While one device 102 and one edge device 100 are illustrated in FIG. 1, more that one device 102 may be in communication with the edge device 100 and/or more than one edge device 100 may be in communication with the device 102.

The device 102 can include, for instance, a device that performs a task (e.g., brushing teeth, cleaning, cooking, etc.) and communicates with the edge device 100. For instance, the device 102 may include an electronic toothbrush, a cleaning device, a cooking or baking appliance, etc. The edge device 100 may or may not be linked to a separate device (e.g., personal computing device, smartphone, tablet, etc.) to enable communications. In some examples, the device 102 may communicate with the edge device 100 via a two-way communication path comprising a device-to-device data link or a data link with a base station or access point. The device 102 can include components of the device 102 (e.g., brushing bristles, cleaning bristles, appliance components, etc.) and a memory resource for temporary storage (e.g., a buffer memory resource).

The device 102, in some examples, may be in communication with a sensor or sensors (not illustrated in FIG. 1). For example, a memory resource of the device 102 may be in communication with the sensor or sensors. Example sensors may include health sensors (e.g., biometric sensor such as a heart monitor, blood glucose monitor, kidney function monitor, lung function monitor, oxygen monitor, etc.), temperature sensors (e.g., body temperature, ambient temperature, etc.), location sensors (e.g., GPS or other location monitor), image sensors, or battery sensors, among others. In some examples, the device 102 may include an ultrasonic sensor to enable visual mapping of an item or user associated with the device 102. For instance, in an example where the device 102 is a toothbrush, the ultrasonic sensor may enable visual mapping of a mouth for detection of gum disease or other gum issues, mouth sores, tooth decay, etc. The ultrasonic sensor may allow for tracking of process of a mouth care regimen, overall oral health, and/or monitoring of safety of a user.

The device 102 may also include a timer, clock, camera, microphone, speaker, battery, or other hardware. In some examples, the sensors and/or other hardware may be configurable at the device 102 or via the edge device 100. For instance, an authorized user may configure a sensor to alert the edge device 100, the device 102, or both, when a threshold event is detected (e.g., threshold gum recession, threshold plaque amount, burned food, low battery, empty cleaning fluid reservoir, etc.). The configuration can be performed via the edge device 100, the device 102, or both. In some examples, an additional edge device may be utilized for configuration. For instance, an authorized user may configure a threshold event via an application downloaded on a mobile device (e.g., a dentist sets a threshold gum recession).

At 104, the edge device 100 can receive input (e.g., to hardware such as a processing resource, memory resource, or both) as initial data 110. For instance, the edge device 100 may receive information associated with the user such as identifying information and/or information associated with the user as it relates to the device 102. For instance, if the device 102 is a toothbrush, the input 104 may include the user's brushing habits, oral needs, etc. In some examples, this information may come from a source other than the user. For example, in the toothbrush example, a dentist may be able to communicate with the edge device 100 (e.g., via a mobile device application, web browser, etc.) to enter suggested brushing habits or oral health history. The edge device 100, in some instances, may receive input via an image sensor including a user's response to the device (e.g., response to brushing) or user feedback, among other inputs.

The input 104 can also include information such as particular settings desired for the device 102 or other instructions specific to the user of the device 102 or the device. For instance, the input 104 can include cleaning and/or timer settings for a cleaning device or settings associated with developmental needs of a user of the device 102. The input 104 can be manually input, for instance via an application on a mobile device or web browser. The input 104 can be received at the edge device 100, in some examples, periodically or on-demand from the cloud storage 108.

The edge device 100 can include instructions associated with the device 102 (e.g., cleaning instructions/programs, brushing instructions/programs, etc.), a timer and/or other hardware, a processing resource, a memory resource, and/or a controller such as a microcontroller. The processing resource, the memory resource, or both may be part of the controller or separate from the controller. In some examples, the edge device 100 can utilize artificial intelligence (AI) and associated machine learning models to determine and update operational instructions associated with performance of the device 102. AI, as used herein, includes a controller, computing device, or other system to perform a task that normally requires human intelligence. For instance, the controller, processing device, memory device or any combination thereof can perform a task (e.g., determining operational instructions for a device) that normally requires human intelligence. In some examples, the edge device 100 can act as a local source of processing and storage for the device 102 while sending data to cloud storage 108 or back to the device 102.

The device 102 and the edge device 114 can output data to the cloud 108 for storage, or to another computing device or computing devices for further use and/or analysis. For instance, upon completion of operational instructions by the device 102, the device 102 may transmit output to the edge device 100, which may transmit the results, including predictive and prescriptive data at 112 to an authorized computing device at 106 such as a user's mobile device, an authorized user's mobile device, and/or an authorized web platform, among others. The device 102, the edge device 100, or both, may transmit the data to cloud storage 108, in some examples. In some instances, data may be transmitted from the cloud storage 108 to an authorized computing device at 106 such as a user's mobile device, an authorized user's mobile device, and/or an authorized web platform, among others as initial inputs and raw data for reports and safety alerts, for instance at 114.

For instance, in the brushing example, the edge device 100 transmits operational instructions to the device 102 at 116. Upon completion of a brushing session by the device 102, the edge device 100 may receive sensor data and/or other data from the device 102 at 118. The edge device 100 can transmit this data to the authorized computing device at 106 and/or the brushing device 102 may output data, in some examples. The authorized computing device may include, for instance, a computing device monitored by a user's dental office, the user's mobile device, or an emergency contact's mobile device, among others. Output may be transmitted to a plurality of authorized computing devices, in some examples.

Example outputs at 106 can include a message or alert sent with respect to a threshold event and dependent on the device 102 (e.g., completed operational instructions, detected gum disease, low battery, threshold dirt amount, broken appliance, etc.). Example outputs at 106 may be in the form of emails, text messages, alerts via an application, etc.

Other example outputs include image data such as photographs or video and audio data. For instance, the device 102 may include a camera that captures image data such as images of teeth, items or locations to be cleaned, food, or other items associated with the device 102. In some examples, a user of the device 102 can indicate he or she needs help (e.g., by pushing a button on the device 102). This indication may be transmitted as output by the device 102, the edge device 100, or both.

In some examples, the output 106 can include a notification with respect to the edge device 100, the device 102 or a sensor associated with the device 102. For instance, the edge device 100 and/or an authorized computing device may be notified (e.g., message, audible alert, visual alert, etc.) when a battery level of the device 102 or an associated sensor falls below a threshold, or if the device 102 has been left on a charger for greater than a threshold time period, which may indicate the user has failed to use the device 102.

Figure 2:
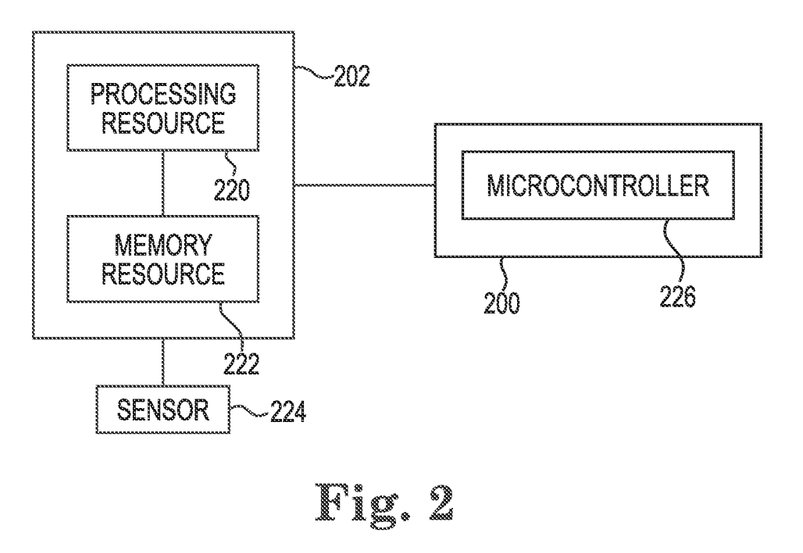
FIG. 2 is a diagram including an edge device and a device in communication with a sensor in accordance with a number of embodiments of the present disclosure.

FIG. 2 is a diagram including an edge device 200 and a device 202 in communication with a sensor 224 in accordance with a number of embodiments of the present disclosure. The example illustrated in FIG. 2 can include a system comprising the device 202 in communication with the sensor 224 and also in communication with the edge device 200. While one edge device 200, one device 202, and one sensor 224 are illustrated in FIG. 2, more of each component may be present as a part of the system.

The device 202 can include a processing resource 220 and a memory resource 220 in communication with the processing resource 222. In some examples, the memory resource 220 may include, at least in part, a buffer memory resource. The memory resource 220, can include, for instance, non-volatile memory comprising phase-change memory or resistive random-access memory (RAM) or a double data rate synchronous dynamic RAM (DDR SDRAM) memory resource, among others.

The sensor 224 can be in communication with the processing resource 220, the memory resource 222, or both, and can be configured to detect data associated with a user of the device 202 or an apparatus monitored by the device 202 and write the data to the memory resource 222. For instance, the memory resource 222 may temporarily store data detected at the sensor 224 until it can be transmitted to the edge device 200.

In a non-limiting example, the processing resource 220 of the device 202 can receive input in the form of signaling from the sensor 224 (e.g., from a processing resource of the sensor). For instance, the sensor 224 may detect that a user of the device 202 has been using the device for longer than expected (e.g., using a brushing device for 5 hours). The processing resource 220, the memory resource 222, or both, of the device 202 can receive this signaling and transmit associated data to the edge device 200.

The device 202 can include other elements including, but not limited to a timer device, a camera for capturing image data (e.g., still and/or video), and other components for operation of the device 202. In some examples, the timer device may track operation of the device 202 (e.g., track brushing time, track cleaning time, track cooking time, etc. dependent on a type of device 202).

The system can include an edge device 200 in communication with the device 202. The edge device 200 may determine operational instructions associated with the device 202. For instance, in an example where the device 202 is a cooking appliance, the edge device 200 may determine the device 202 should cook a particular food item for 10 minutes at 350 degrees. The edge device 200 can include a microcontroller 226 that can include a phase-change memory or resistive random-access memory (RAM) memory resource that may be part of or separate from the microcontroller 226. The microcontroller 226, in some examples is a small computing device on a single metal-oxide-semiconductor integrated circuit chip. The microcontroller 226 can include one or more processing resources, a memory resource, and programmable input/output peripherals.

In some examples, the microcontroller 226 is configured to receive first input from the processing resource 220, the memory resource 222, or both, including the data detected at the sensor 224. For instance, in the cooking appliance example, the sensor 224 may detect that food being cooked by the device 202 is burning (e.g., smoke about a threshold amount), and this can be received at the edge device 200 as the first input. Other first input may include, for instance, status updates of the device (e.g., replace battery, underperforming component, etc.).

The microcontroller 226 can be configured to receive second input from a plurality of sources and determine, based on the first and the second input, operational instructions for the device 202. The second input, for instance, can include input receive from an authorized computing device or cloud storage such as user identification, user habits and/or preferences, manufacturer data, default settings, etc. Based on the second input, the microcontroller 226 can determine the operational instructions. For instance, in the cooking appliance example, the microcontroller 226 may receive first input that a previous operation of the device 202 resulted in burned food, while second input received at the microcontroller 226 indicated that the user prefers lightly cooked food. As a result, the microcontroller 226 can determine that the temperature and/or cooking time of the device 202 should be reduced.

The microcontroller 226 can be configured to transmit (e.g., via a radio) the operational instructions to the device 202 and update, using a machine learning model, the operational instructions responsive to third input received from the device, one or more of the plurality of sources, or both. For instance, in the cooking appliance example, upon completion of the cooking, the microcontroller 226 may receive third input from the device 202 that the food was undercooked. Using a machine learning model, the operational instructions may be updated. Other third input in the cooking appliance example may include updated input from a user regarding cooking preferences, or input from a caregiver indicating limits to use of the device 202. The machine learning model can be updated each time new data is received at the microcontroller or the machine learning model can be updated periodically (e.g., updated once per day).

In some examples, the device 202 can be configured to transmit a result of completion of the operational instructions to the edge device 200, and the microcontroller 226 can be configured to transmit the result to cloud storage, an authorized computing device, or both. For instance, in the cooking appliance example, the undercooked result may be transmitted to the edge device 200, and subsequently to the cloud storage and/or authorized computing device. The edge device 200 can access the cloud storage and retrieve the undercooked data for future reference and/or to further update the machine learning model. An authorized computing device, such as a caregiver's computing device or a user's mobile device, may be alerted in case the caregiver wants to communicate with the user or the user has chosen (e.g., via an application) to be alerted, for instance.

In some examples, the processing resource 220, the memory resource 222, or both, can periodically share data associated with the user of the device 202 or the apparatus monitored by the device 202 with the microcontroller 226. For instance, the device 202 may share data as it is performing operational instructions, before it performs operational instructions, and/or after it performs operational instructions. The device 202 may also share data at particular time intervals, for instance twice per day, in real-time (e.g., as data is available to share with the edge device 200, or near-continuously (e.g., without meaningful breaks). The microcontroller 225 can transmit an alert associated with the shared data to an authorized computing device, in some examples. For instance, if the shared data includes an alert that the device 202 or the sensor 224 has a low battery, an alert can be transmitted to the authorized computing device, such as a user's mobile device or an emergency contact's mobile device or computing device.

In some examples, the system may include an additional edge device (not illustrated in FIG. 2) configured to facilitate transmission of the first input, the second input, the operational instructions, the updated machine learning model, or any combination thereof to cloud storage. For instance, the additional edge device may include a computing device such as a mobile device. In such an example, the edge device 200 may transmit the first input, the second input, the operational instructions, the updated machine learning model, or any combination thereof to the additional edge device, which may transmit the second input, the operational instructions, the updated machine learning model, or any combination thereof to cloud storage. In such an example, the edge device 200 may include a buffer memory device for temporary storage of data received from the device 202.

The additional edge device, in some instances, may enable data classification associated with the device 202 and the edge device 200 and can facilitate habit clustering and supervised learning of the machine learning model. For instance, the user or another authorized user may monitor the user's habits and the machine learning model via a mobile device application updated with data from cloud storage and/or the edge device 200. Similar, the additional edge device can facilitate viewing of charts, graphs, and other images to aid in decision-making by caregivers, health care providers, parents, etc., can provide reminders (e.g., remind to brush, remind to replace component of the device 202, etc.), and can store a history of the user's habits and other user information obtained from the sensor 224.

Figure 3:
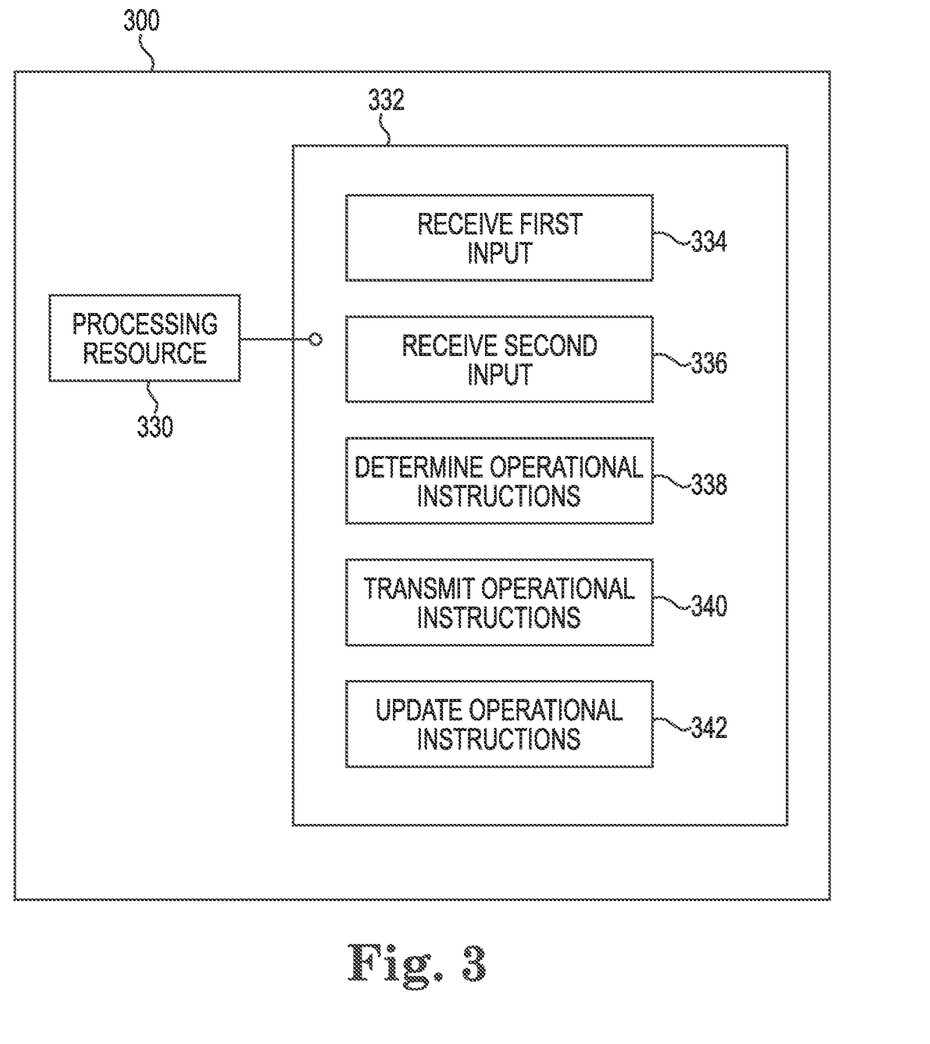
FIG. 3 is a functional diagram representing a processing resource in communication with a memory resource having instructions written thereon in accordance with a number of embodiments of the present disclosure.

FIG. 3 is a functional diagram representing a processing resource 330 in communication with a memory resource 332 having instructions 334, 336, 338, 340, 342 written thereon in accordance with a number of embodiments of the present disclosure. In some examples, the processing resource 330 and the memory resource 332 comprise an edge device 300 such as the edge devices 100, 200 illustrated in FIGS. 1 and 2, respectively. In some examples, the processing resource 330 and the memory resource 332 comprise a microcontroller such as the microcontroller 226 illustrated in FIG. 2.

The system or device 300 illustrated in FIG. 3 can be a server or a computing device (among others) and can include the processing resource 330. The system or device 300 can further include the memory resource 332 (e.g., a non-transitory MRM), on which may be stored instructions, such as instructions 334, 336, 338, 340, 342. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 332 may be electronic, magnetic, optical, or other physical storage device that stores executable instructions. Thus, the memory resource 332 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 332 is a non-transitory MRM comprising Random Access Memory (RAM), an Electrically-Erasable Programmable ROM (EEPROM), a storage drive, an optical disc, and the like. The memory resource 332 may be disposed within a controller (e.g., microcontroller) and/or computing device. In this example, the executable instructions 334, 336, 338, 340, 342 can be "installed" on the device. Additionally, and/or alternatively, the memory resource 332 can be a portable, external or remote storage medium, for example, that allows the system to download the instructions 334, 336, 338, 340, 342 from the portable/external/remote storage medium. In this situation, the executable instructions may be part of an "installation package". As described herein, the memory resource 332 can be encoded with executable instructions associated with an edge device.

The instructions 334, when executed by a processing resource such as the processing resource 330 can include instructions to receive, at the processing resource, the memory resource, or both, and from a first source comprising a device in communication with the edge device 300, first input associated with a user of the device. For instance, the first input can include prior or current use of the device, signaling received from a sensor in communication with the device, image data associated with the user, etc.

In a non-limiting example, the edge device 300 may be a docking station for a toothbrush, which can be the device in communication with the edge device 300. The device can be docked to the edge device 300, and while docked, the device can have its battery charged and share data with the edge device 300. The device and the edge device 300 can share data through a wired connection or can share data wirelessly. In some examples, the device need not be in physical contact with the edge device 300 for the device and the edge device 300 to share data. The edge device 300 can receive as the first input data associated with a user of the toothbrush such as plaque levels, gum disease progression, image data associated with teeth and guns, length of brushing time, battery life of toothbrush, etc. The toothbrush can include a sensor, sensors, a camera, and/or can be in communication with a sensor, sensors, a camera to gather the data.

The instructions 336, when executed by a processing resource such as the processing resource 330, can include instructions to receive, from a second source, second input associated with a user of the device. The second source can include an authorized user device such as a personal computing device or mobile device. The second source, in some instances, can include cloud storage. The second input can include, for instance data associated with a user of the device, manufacturer information, or instructions from a third party, among others.

For instance, in the edge device 300 as a docking station example, the edge device 300 may receive the second input from a dental office (e.g., via a web platform or mobile device application) including treatment plans, brushing suggestions, dental health concerns, goals, etc. The edge device 300 may receive the second input, from the user of the toothbrush (e.g., via a web platform or mobile device application) including, for instance, identifying information, brushing habits, prior health conditions, etc. Other sources may include other authorized users such as healthcare providers, caretakers, parents, etc.

The instructions 338, when executed by a processing resource such as the processing resource 330, can include instructions to determine, based on the first input and the second input, operational instructions for the device. For instance, using data received as the first and the second inputs, the edge device 300 can determine settings and thresholds for the device to result in desired outcomes. For instance, in the edge device 300 as a docking station example, the edge device 300 may determine a pressure at which the device should brush, a length of time for which the device should brush, an amount and/or type of toothpaste to be distributed, etc.

The instructions 340, when executed by a processing resource such as the processing resource 330, can include instructions to transmit (e.g., via a radio) the operational instructions to the device. For instance, in the previous example, the edge device 300 may transmit pressures and time limits for brushing to the device.

The instructions 342, when executed by a processing resource such as the processing resource 330, can include instructions to update, using a machine learning model, the operational instructions responsive to receiving an indication of performance of the operational instructions by the device and third input received from the first source, the second source, or both. For instance, new or updated input from any or all of the sources can be saved in the memory resource 332 or cloud storage, and the machine learning model can self-learn to update and improve accuracy and efficiency of the operational instructions.

In some examples, the memory resource 332 can include instructions executable to transmit the operational instructions to cloud storage. For instance, the memory resource 332 may be a buffer memory resource configured to temporarily store data such that the operational instructions and/or other data are transmitted to cloud storage and may be accessed as needed by the edge device 300.

The memory resource 332 can include instructions executable to instruct hardware of the edge device 300 to perform a physical task associated with the operational instructions, in some examples. For instance, the operational instructions may include the edge device 300 preparing the device for completion a task. In the edge device 300 as a docking station example, the edge device 300 may store toothpaste and dispense the toothpaste onto the device (e.g., toothbrush) as indicated by the operational instructions.

In some examples, the memory resource 332 can include instructions executable to track a status of the device before transmission of the operational instructions to the device and in response to receiving the indication of performance of the operational instructions by the device. For example, the edge device 300 can receive a current status from the device before the device begins its task, while it performs the task, after it performs the task, or any combination thereof. In the previous example, the edge device 300 may receive status updates from the toothbrush regarding battery life, condition of brush heads, condition of other toothbrush hardware (e.g., water sprayer, toothpaste holder, etc.), toothbrush buffer memory status, etc.

In some examples, the memory resource 332 can include instructions executable to assess hardware of the edge device 300 and transmit a result of the assessment to an authorized computing device. For instance, the edge device 300 may be due for scheduled maintenance or have an underperforming hardware component. For instance, in the edge device 300 as a docking station example, a reservoir for toothpaste storage made need refilling or a battery may need replacement. This information can be transmitted to the authorized computing device to notify a user or other recipient that action is requested.

Figure 4:
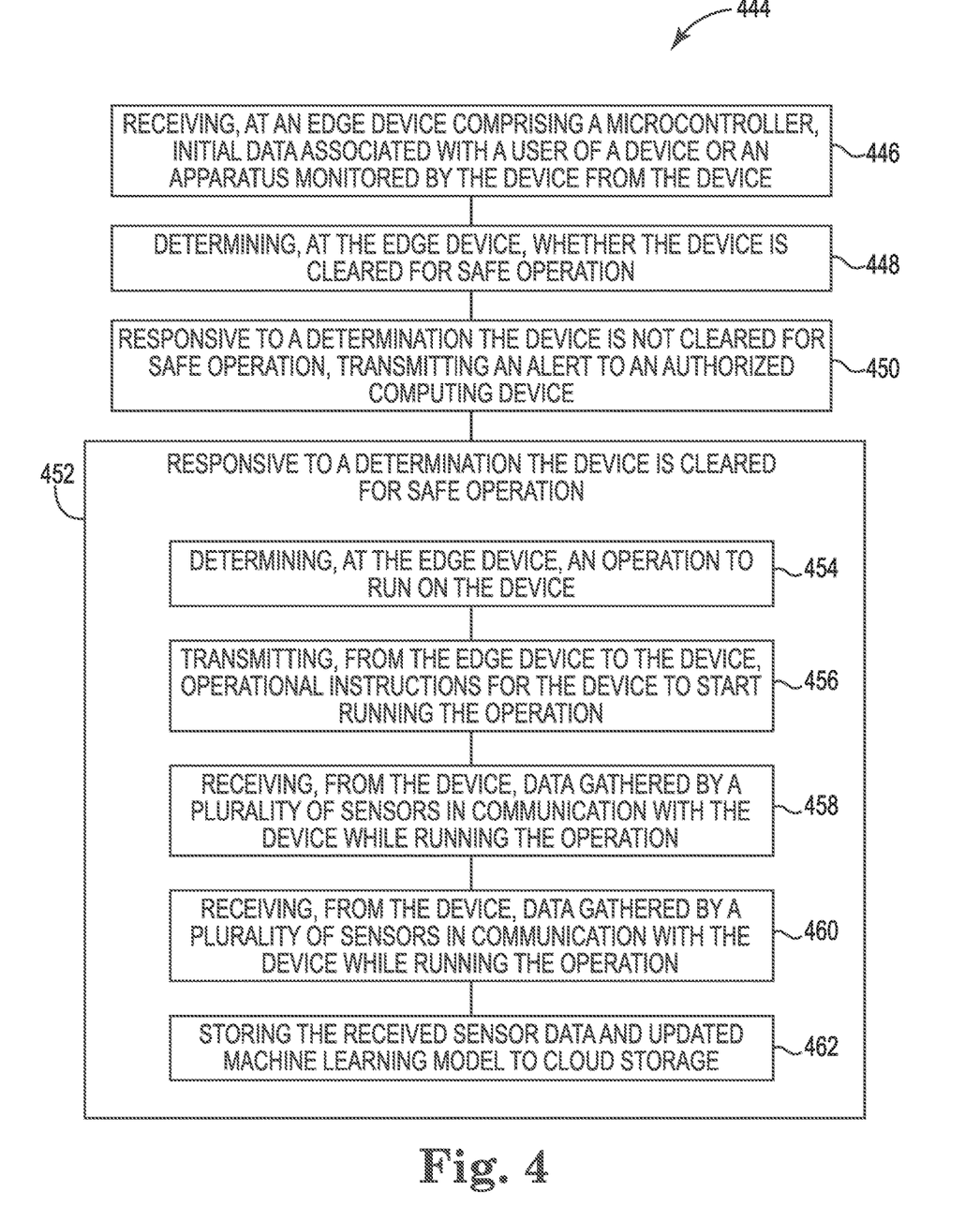
FIG. 4 is a flow diagram representing an example method associated with an edge device in accordance with a number of embodiments of the present disclosure.

FIG. 4 is a flow diagram representing an example method 444 associated with an edge device in accordance with a number of embodiments of the present disclosure. The method 444 may be performed, in some examples, using a system and/or a device such as devices 100, 200, 300 and 102 and 202, as described with respect to FIGS. 1-3.

At 446, the method 444 includes receiving, at an edge device comprising a microcontroller, initial data associated with a user of a device or an apparatus monitored by the device from the device. The device and the edge device may be in communication with one another via wired or wireless connections such that the edge device and the device can share data with one another. For instance, the user may be a person or animal wearing or operating the device such as a human operating the device (e.g., a toothbrush), and the apparatus may be may an inanimate object monitored by the device such as floor monitored by the device (e.g., a cleaning device) or an appliance monitored by the device.

The initial data received at the edge device can include sensor data associated with the user or apparatus that is received from a sensor in communication with the device, hardware status of the device, or other data associated with a user of the device or apparatus monitored by the device. For instance, in an example where the device in communication with the edge device is a cleaning device, the initial data may include battery levels, cleaning material levels, waste bin levels, etc.

At 448, the method 444 includes determining, at the edge device, whether the device is cleared for safe operation. The edge device can determine, for instance using the initial data, whether the device is safe to operate. In the cleaning device example, a determination that the device is cleared for safe operation may be made when status updates indicate the device is in working conditions, battery levels are sufficient, cleaning material is not leaking, the device is clear of obstructions, or waste bins are not full, among others. In contrast, a determination that the device is not cleared for safe operation may be made when status updates indicate the device is not in working conditions, battery levels are insufficient, cleaning material is leaking, the device detects obstructions, the device is sitting in undesired water, or waste bins are full, among others.

At 450, the method 444 includes transmitting an alert to an authorized computing device responsive to a determination the device is not cleared for safe operation. An alert can be sent via a message, call, etc. to a mobile device, web browser, or other notification system, so an authorized user can address the issue with the device. For instance, a user may clear obstructions from the path of a cleaning device.

The method 444, at 452, includes a determination that the device is cleared for safe operation, and at 454, the method 444 includes determining, at the edge device, an operation to run on the device responsive to the determination that the device is cleared for safe operation. The determination can be based on the initial data, data received from other sources including the user and/or other authorized users, previously collected data, or a combination thereof. For instance, in the cleaning device example, the edge device may receive input from a user of the device with respect to desired cleanliness level, frequency of cleaning, etc. The edge device may receive input from cloud storage including device manufacturer standards, battery life information, etc. Using the different inputs, a determination can be made about a cleaning operation including, for instance, how much cleaning material to dispense, frequency of cleaning, length of time for a particular cleaning where to clean, focus areas of cleaning, etc.

At 456, the method 444 includes transmitting, from the edge device to the device, operational instructions for the device to start running the operation, and at 458 includes receiving, from the device, data gathered by a plurality of sensors in communication with the device while running the operation. For instance, the edge device can send instructions via a wired or wireless connection to the device with respect to performing the determined operation (e.g., task). While performing the task, sensors in communication with the device can gather data that can be transmitted to the edge device. In the cleaning device example, the sensor data may include dirt levels, reduced battery life levels, detected obstructions, etc.

At 460, the method 444 includes updating a machine learning model associated with the operation, at the edge device, based on the received sensor data. The received sensor data, in some examples, can be stored in cloud storage, temporarily on the device, on the edge device, or any combination thereof. Using the sensor data, the machine learning model can self-learn to update and improve accuracy and efficiency of the operational instructions. Along with the sensor data, other data available to the edge device and associated machine learning model can be used to update the machine learning model including, for instance, data from cloud storage including data associated with previous sensor data or other previously received data.

In some examples, updating the machine learning model comprises updating a lifetime prediction of the device based on the received sensor data and associated data in the cloud storage. For instance, in the cleaning device example, using manufacturer data, previous operational data (e.g., length of time, conditions, etc.), current and previous battery life performance, etc., an estimation of remaining life of the cleaning device can be made and/or a suggested replacement timeline. The updated machine learning model can be stored to cloud storage, in some examples.

In some examples, the method 444 can include updating firmware of the edge device based on the updated machine learning model and the received sensor data. For instance, firmware can be updated to improve performance of the edge device including improved operational instructions, which can improve performance of the device. In the cleaning device example, edge device firmware may be updated based on sensor data and or the updated machine learning model indicating underperformance of the device (e.g., insufficient cleaning material, etc.) or the edge device (e.g., insufficient monitoring of the device, etc.).

The method 444, in some examples, can include performing a physical task at the edge device associated with the operational instructions. For instance, a physical task can be performed to aid in performance of the operation by the device. For instance, in the cleaning device example, the edge device can include a reservoir of cleaning material to refill the device. Based on operational instructions indicating a cleaning surface of a particular size, the edge device can perform the physical task of filling the device with an appropriate amount of cleaning material.

Figure 5A:
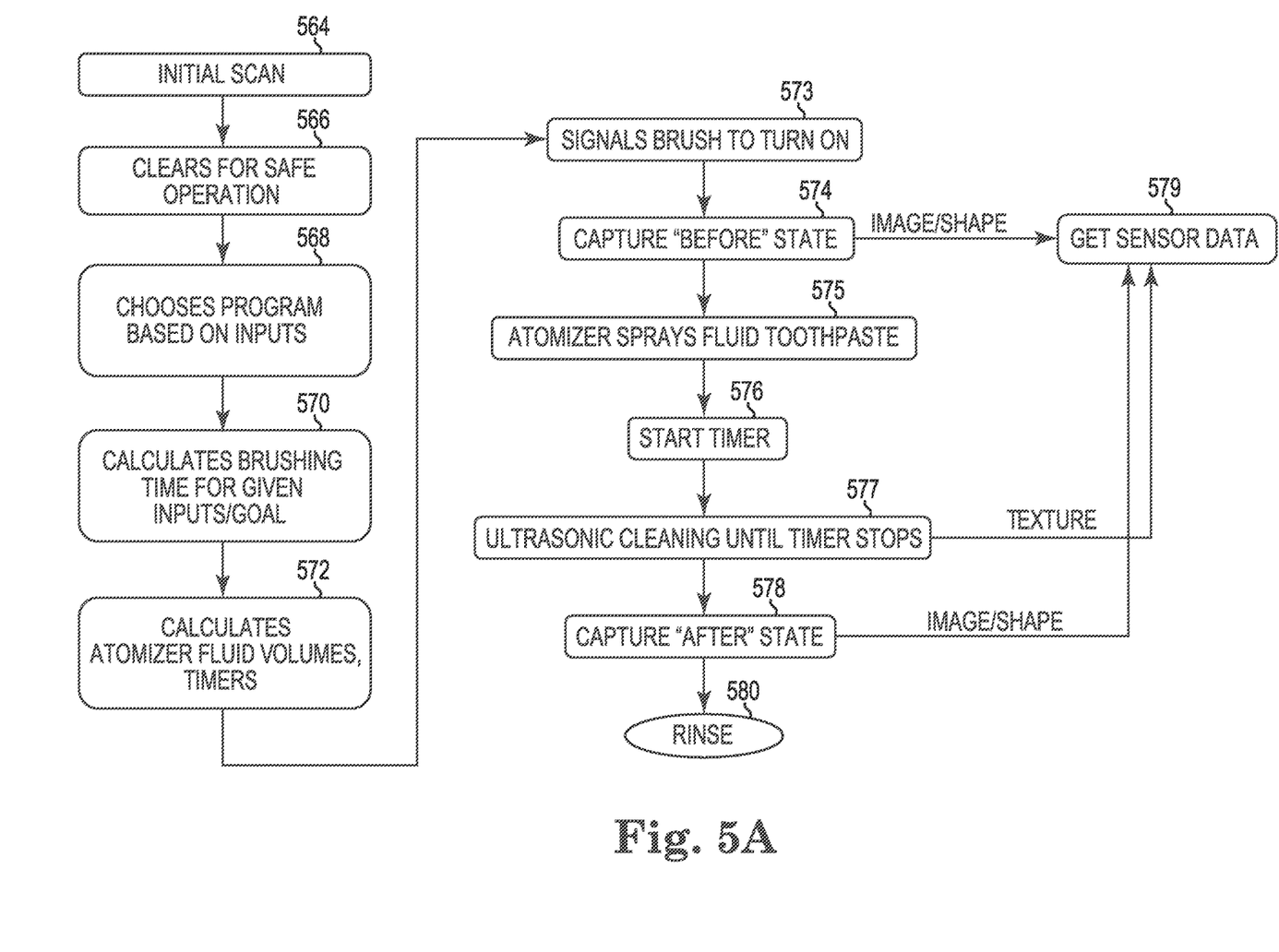
FIGS. 5A and 5B are flow diagrams representing an example method associated with an edge device in accordance with a number of embodiments of the present disclosure.
Figure 5B:
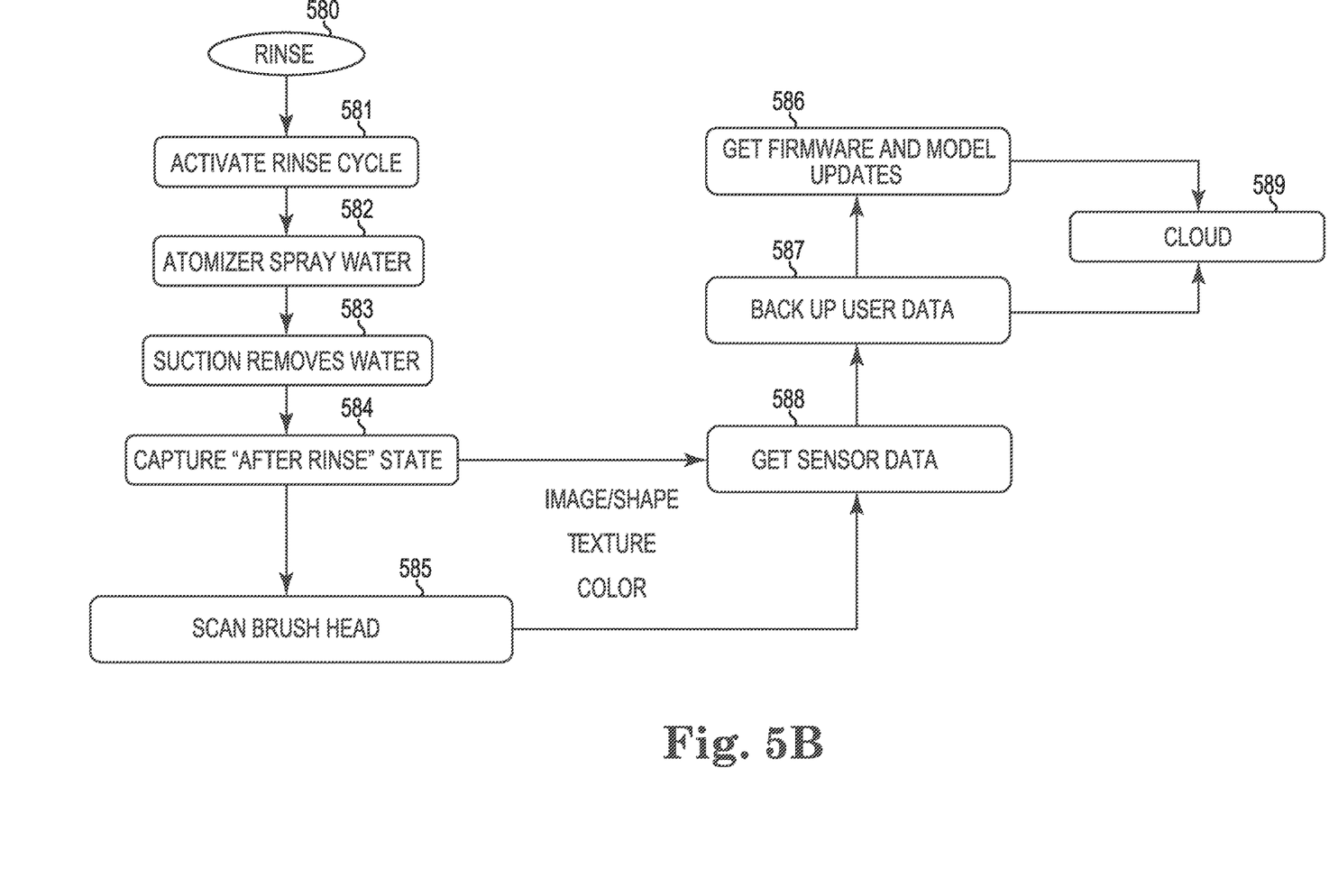

FIGS. 5A and 5B are flow diagrams representing an example method associated with an edge device in accordance with a number of embodiments of the present disclosure. The edge device and the device can be in communication with one another via a wired connection, wireless connection, or a combination thereof. The method may be performed, in some examples, using a system and/or a device such as devices 100, 200, 300 and 102 and 202, as described with respect to FIGS. 1-3.

In the examples illustrated in FIGS. 5A and 5B, the device is a toothbrush, and the edge device is a docking station for the toothbrush. The terms "device" and "toothbrush" and the terms "edge device" and "docking station" may be used interchangeable with respect to FIGS. 5A and 5B, but it should be understood a device that is not a toothbrush and an edge device that is not a docking station may perform tasks as described herein.

The docking station can charge a battery of the toothbrush while the toothbrush is connected to the docking station. The docking station can include a memory resource and/or a microcontroller for storing and processing data acquired by sensors associated with the toothbrush. The docking station can wirelessly connect the toothbrush to an additional edge device (e.g., a user's mobile device, authorized user's mobile device) to facilitation notifications, configuration parameter settings, and progress tracking (e.g., via an application). The docking station can wirelessly connect the toothbrush to cloud storage, and in some examples, the docking station can track a brush head life expectancy using machine learning models. In some examples, the docking station can include a reservoir that supplies water, toothpaste, mouthwash, or other liquids to the toothbrush. The docking station may sanitize the brush head in some instance, for instance using ultraviolet light or heat.

The toothbrush can include brushing, flossing, and rinsing capabilities. In some examples, the toothbrush may be a hands-free mouthpiece toothbrush. The toothbrush can include a buffer memory, sensors, an atomizer to dispense water, toothpaste, and/or other liquids, and a suction device for rinse the user's mouth before, during, and/or after brushing.

At 564, the toothbrush performs an initial scan. This initial scan can include, for instance, scanning the inside of a user's mouth using an image sensor. The toothbrush, for example, may be a mouthguard-shaped brush that can scan or be in communication with a sensor that can scan the user's mouth and teeth for obstructions.

At 566, the docking station clears the toothbrush for safe operation. For instance, the toothbrush can transmit its findings during the scan to the docking station, and if no obstructions are detected, the toothbrush may be cleared. In other examples, the docking station may track the location of the toothbrush (e.g., using a location sensor on the toothbrush) to determine how long the toothbrush has been away from or with the docking station. For instance, if the toothbrush has been away from the docking station for a threshold period of time (e.g., 3 hours), the edge device may alert an authorized user in case the user of the toothbrush is in need of help. If the location of the device and associated length of times are within a threshold, the docking station can clear the toothbrush for safe operation.

At 568, the docking station determines an operation (e.g., program, task, etc.) to run on the toothbrush based on inputs it has received. The inputs, for example, can include personal information associated with the user of the toothbrush including age, cognitive level, advice from health care providers (e.g., dentists, orthodontists, etc.) including brushing lengths, bristle pressures, frequencies, user brushing habits, images of teeth and gums, etc. For instance, the docking station may determine based on the inputs that the user has an increase in plaque and may determine a plaque removal program should be implemented.

The method at 570 can include the docking station calculating a brushing time based on the inputs/goals/program, etc. For instance, using the inputs and a machine learning model, a determination can be made that to reach the plaque removal goal based on current plaque levels and previous history, a brushing regimen of three times per day for two minutes each time using a particular amount of toothpaste, for instance as determined by the docking station at 572, is desirable. The docking station, at 572, may calculate fluid volumes for an atomizer that is part of the toothbrush, and determine an amount to distribute to the atomizer from the docking station reservoir. The docking station can set timers and/or alarms on the toothbrush, the docking station, or both, for brushing length and frequency.

At 573, the docking station can transmit operational instructions (e.g., signal) the toothbrush to turn on and commence the determined brushing program including instructing the toothbrush on brush times, fluid toothpaste volume, fluid rinse volume, rinse cycle time, etc., and the toothpaste can receive these inputs. At 574, the toothbrush can capture a "before" state of the teeth, gums, mouth, or any combination thereof. For instance, sensors in communication with the toothbrush can capture data associated with the gums, teeth, and mouth, including for instance gum disease progress, tooth decay, plaque, etc. For instance, an ultrasonic sensor located on the front of the toothbrush may detect and monitor such data. This sensor data can be stored in a buffer memory of the toothbrush and transmitted as image data (e.g., shapes, images, textures, etc.) or non-image data at 579 to the docking station.

At 575, an atomizer of the toothbrush can distribute or "spray" the determined amount of fluid toothpaste onto the teeth or onto the toothbrush, at 576, a timer can begin on the toothbrush, and at 577, the toothbrush can commence brushing (e.g., ultrasonic cleaning) until the timer stops. Sensor data collected during the brushing and rinsing portions can include texture data of the teeth and can be stored in a buffer memory of the toothbrush and transmitted to the docking station at 579.

At 578, the toothbrush can capture an "after" state of the teeth, gums, mouth, or any combination thereof. For instance, sensors in communication with the toothbrush can capture data associated with the gums, teeth, and mouth, including for instance gum disease progress, tooth decay, plaque, etc. This data may be the same data collected during the "before" state for use in comparisons at the docking station. This sensor data can be stored in a buffer memory of the toothbrush and transmitted as image data (e.g., shapes, images, textures, etc.) or non-image data at 579 to the docking station.

At 580, a rinse process can begin as illustrated in FIGS. 5A and 5B. At 581 the toothbrush can activate the rinse cycle and the atomizer of the toothbrush can spray water for the rinse at 582. The method, at 583, can include a suction function to remove water from the toothbrush and/or the user's mouth. At 584, the toothbrush can capture an "after rinse" state of the teeth, gums, mouth, or any combination thereof. For instance, sensors in communication with the toothbrush can capture data associated with the gums, teeth, and mouth, including for instance gum disease progress, tooth decay, plaque, etc. This data may be the same data collected during the "before" and/or "after" states for use in comparisons at the docking station. This sensor data can be stored in a buffer memory of the toothbrush and transmitted as image data (e.g., shapes, images, textures, colors etc.) or non-image data at 588 to the docking station.

At 585, the toothbrush is returned to the docking station where the toothbrush and its components (e.g., brush head, rinsing components, etc.) are scanned. The docking station can use previously collected and stored data to determine if any components of the toothbrush are reaching replacement levels, and this data can be transmitted to the docking station at 588.

At 587, data received from the toothbrush at the docking station can be backed up to a memory resource of the docking station or to cloud storage at 589. At 586, the docking station can update firmware and machine learning models (e.g., a tooth decay classification model, a gum disease classification model, a brush head lifetime prediction model, etc.) based on the data received during performance of the brushing program and associated operational instructions. In some examples, the machine learning models can be updated in real time (e.g., as new data is received), periodically (e.g., twice per day), or as instructed by a user. For instance, an authorized user may access and application on his or her mobile device and request updating of firmware and/or machine learning models associated with the docking station.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An edge device, comprising:
   a processing resource; and
   a memory resource in communication with the processing resource having instructions executable to:
      receive, at the processing resource, the memory resource, or both, and from a first source comprising a device in communication with the edge device, first input associated with physical data of a user of the device;
      receive, from a second source, second input associated with a user of the device;
      determine, based on the first input and the second input, operational instructions for the device;
      determine whether the device is cleared for safe operation;
      responsive to a determination the device is not cleared for safe operation, transmit an alert to an authorized computing device;
      responsive to a determination the device is cleared for safe operation:
         transmit the operational instructions to the device; and
         update, using a machine learning model, the operational instructions responsive to:
            receiving an indication of performance of the operational instructions by the device; and
            third input received from the first source, the second source, or both,
               wherein the third input comprises updated data received from the first source, the second source, or both.

2. The edge device of claim 1, wherein the memory resource and the processing resource comprise a microcontroller.

3. The edge device of claim 1, further comprising instructions executable to transmit the operational instructions to cloud storage.

4. The edge device of claim 1, further comprising instructions executable to instruct hardware of the edge device to perform a physical task associated with the operational instructions.

5. The edge device of claim 1, further comprising instructions executable to track a status of the device before transmission of the operational instructions to the device and in response to receiving the indication of performance of the operational instructions by the device.

6. The edge device of claim 1, further comprising instructions executable to assess hardware of the edge device and transmit a result of the assessment to an authorized computing device.

7. A system, comprising:
   a device, comprising:
      a processing resource;
      a memory resource in communication with the processing resource;
      a sensor in communication with the processing resource, the memory resource, or both, the sensor configured to:
         detect physical data associated with a user of the device or an apparatus monitored by the device; and
         write the physical data to the memory resource;
   an edge device in communication with the device, and comprising:
      a microcontroller configured to:
         receive first input from the processing resource, the memory resource, or both, including the physical data detected at the sensor;
         receive second input from a plurality of sources;
         determine, based on the first and the second input, operational instructions for the device;
         determine whether the device is cleared for safe operation;
         responsive to a determination the device is not cleared for safe operation, transmit an alert to an authorized computing device;
         responsive to a determination the device is cleared for safe operation:
            transmit the operational instructions to the device; and
            update, using a machine learning model, the operational instructions responsive to third input received from the device, one or more of the plurality of sources, or both.

8. The system of claim 7, wherein the memory resource is a non-volatile memory comprising phase-change memory or resistive random-access memory (RAM) or a double data rate synchronous dynamic RAM (DDR SDRAM) memory resource.

9. The system of claim 7, further comprising:
   the device configured to transmit a result of completion of the operational instructions to the edge device; and
   the microcontroller configured to transmit the result to cloud storage.

10. The system of claim 7, further comprising:
    the device to transmit a result of completion of the operational instructions to the edge device; and
    the microcontroller configured to transmit the result to an authorized computing device.

11. The system of claim 7, further wherein the processing resource, the memory resource, or both, are configured to periodically share data associated with the user of the device or the apparatus monitored by the device with the microcontroller.

12. The system of claim 11, wherein the microcontroller is configured to transmit an alert associated with the shared data to an authorized computing device.

13. The system of claim 7, further comprising an additional edge device configured to facilitate transmission of the first input, the second input, the operational instructions, the updated machine learning model, or any combination thereof to cloud storage.

14. The system of claim 7, wherein the device comprises a timer device to track operation of the device.

15. The system of claim 7, wherein the edge device further comprises a phase-change memory or resistive random-access memory (RAM) memory resource.

16. A method, comprising:
receiving, at an edge device comprising a microcontroller, initial physical data associated with a user of a device or an apparatus monitored by the device from the device,
wherein the device in communication with the edge device;
determining, at the edge device, whether the device is cleared for safe operation;
responsive to a determination the device is not cleared for safe operation, transmitting an alert to an authorized computing device;
responsive to a determination the device is cleared for safe operation:
determining, at the edge device and based on the initial physical data, an operation to run on the device;
transmitting, from the edge device to the device, operational instructions for the device to start running the operation;
receiving, from the device, data gathered by a plurality of sensors in communication with the device while running the operation;
updating a machine learning model associated with the operation, at the edge device, based on the received sensor data; and
storing the received sensor data and updated machine learning model to cloud storage.

17. The method of claim 16, further comprising updating firmware of the edge device based on the updated machine learning model and the received sensor data.

18. The method of claim 16, further comprising performing a physical task at the edge device associated with the operational instructions.

19. The method of claim 16, further comprising updating the machine learning model based on the received sensor data and associated data in the cloud storage.

20. The method of claim 16, wherein updating the machine learning model comprises updating a lifetime prediction of the device based on the received sensor data and associated data in the cloud storage.

* * * * *